United States Patent [19]
Bush

[11] 3,741,163
[45] June 26, 1973

[54] DEMAND-RESPONSIVE FISH FEEDER

[76] Inventor: Dale A. Bush, 1024 West Lovers Lane, Arlington, Tex.

[22] Filed: Nov. 13, 1970

[21] Appl. No.: 89,410

[52] U.S. Cl. ............................ 119/54, 119/3, 119/51
[51] Int. Cl. ......................... A01k 5/02, A01k 64/00
[58] Field of Search ...................... 119/51, 53.5, 54, 119/75, 3

[56] References Cited
UNITED STATES PATENTS

| | | | |
|---|---|---|---|
| 1,107,394 | 8/1914 | Wood | 119/56 R |
| 2,866,435 | 12/1958 | Blazier | 119/53 |
| 3,453,768 | 7/1969 | Feaster | 43/42.06 |
| 3,643,632 | 2/1972 | Poirot | 119/54 |
| 3,487,433 | 12/1969 | Fleming | 119/54 |
| 1,375,622 | 4/1921 | Abts | 119/54 |
| 2,972,334 | 2/1961 | Braden | 119/51 |
| 70,401 | 11/1867 | Bowerman | 119/54 X |
| 1,309,090 | 7/1919 | Henson | 119/54 |
| 1,506,079 | 8/1924 | Pence | 119/54 |
| 1,936,295 | 11/1933 | Engelke | 119/53.5 |

*Primary Examiner*—Aldrich F. Medbery
*Attorney*—James M. Cate

[57] ABSTRACT

A fish feeder is operable to dispense quantities of particulate feed into a fish-containing body of water in response to normal feeding activities of the fish. A hopper contains a supply of feed above the water surface and an actuating means, disposed externally of the hopper, includes a lower portion extending below the water surface and is operable to release desired quantities of feed in response to movement of the lower portion by fish adjacent the lower portion.

17 Claims, 6 Drawing Figures

PATENTED JUN 26 1973  3,741,163
DALE A. BUSH
INVENTOR
BY James M. Cate
ATTORNEY
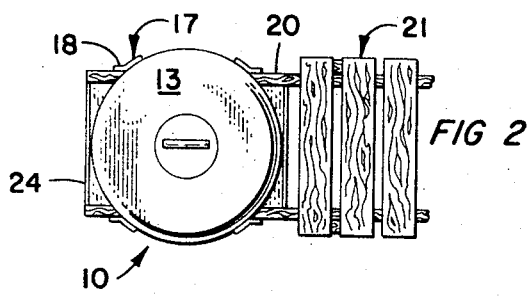
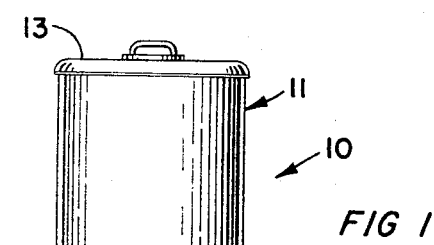
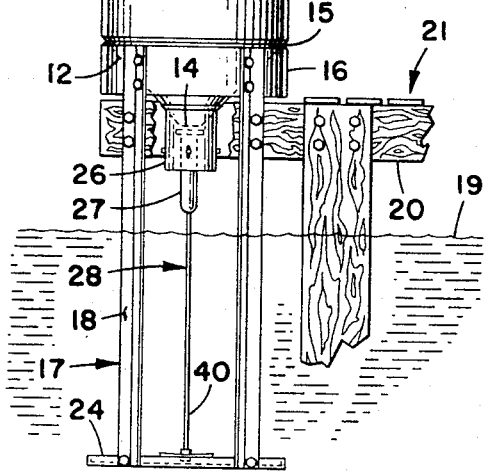
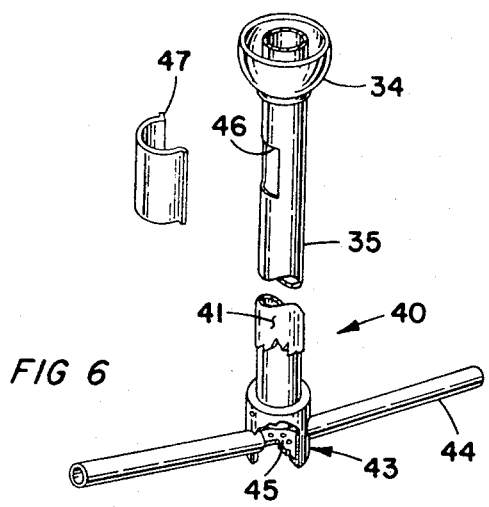
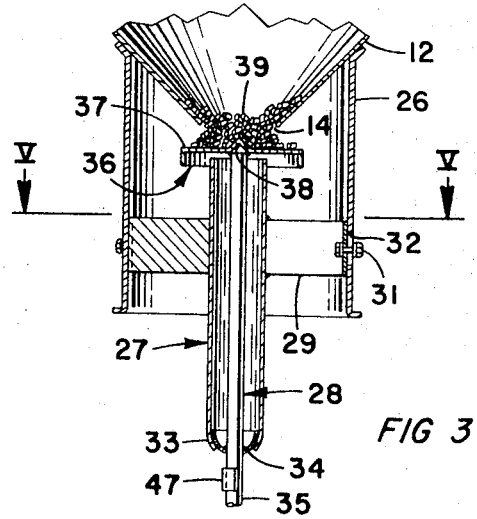
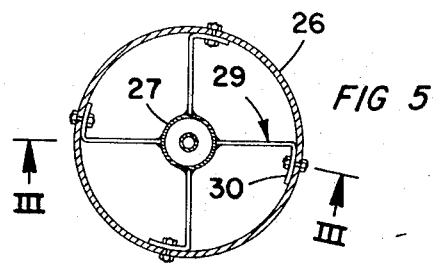
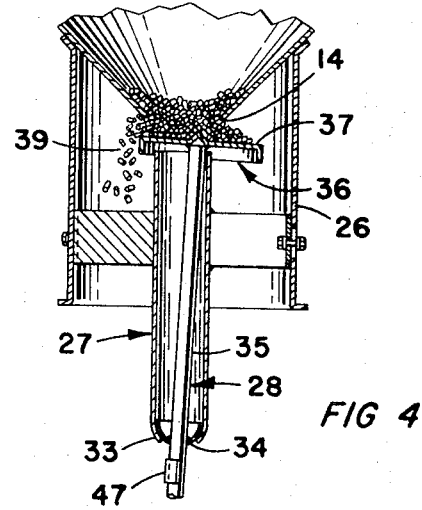

DEMAND-RESPONSIVE FISH FEEDER

This invention relates to apparatus for dispensing particulate feed into a fish-containing body of water and, more particularly, to such an apparatus which is operable to dispense quantities of feed upon movement of a portion of the apparatus by fish feeding adjacent thereto.

The fish growing or "farming" industry, wherein fish are raised under controlled conditions in enclosed bodies of water, is considered to be a potentially important means for providing needed, additional quantities of protein food on an economically practical basis. Under present methods, the fish are generally fed at least daily by workers who supply an amount of particulate, prepared feed in an amount determined by a predetermined formula and according to the average size or age of the fish. Although relatively very little maintenance is required for even a substantial fish growing operation, it is essential that the fish be fed regularly, since the fish are contained in enclosed areas of water in far greater concentrations than is possible in a natural environment. For these reasons, the expense of maintaining reliable personnel to ensure regular feeding is often a major portion of the costs involved in the fish growing process and, indeed, is often a prohibitive factor when it is desired to conduct a relatively small operation. Particularly is this the case when an owner lives in an area remote from the fish tanks and is not able personally to conduct the daily inspection and feeding chores required. Moreover, even in the case of large scale operations, daily feeding of the fish according to a predetermined formula is often inefficient. While it is known that the growth rate of the fish can be greatly increased by proper feeding, the feeding habits of fish are highly variable during changes of weather and water conditions and because of other factors. Thus, an average daily supply of feed may be largely wasted and contribute to pollution of the tank when the fish are relatively inactive, but will not be sufficient when the fish are actively feeding. Further, it has been observed that when a quantity of feed is deposited into a tank, the larger or more aggressive fish often tend to drive away the less developed fish during feeding, thus preventing consistent growth of all the fish in a tank.

For these reasons it has been attempted to develop automatic feeding devices which can be filled weekly, or at even greater intervals, and which will provide feed continuously, at a desired rate. Unfortunately, such devices have in the past experienced only limited success, and the majority of fish growers still employ personnel to distribute feed to the fish. Such fish feeding devices have been of two major types. The first includes continuously operable mechanisms which deposit feed into a body of water at a predetermined rate, and which are normally electrically powered. These devices suffer from the disadvantage that, as suggested above, the feeding habits of the fish may vary erratically according to weather conditions, growth rate, and other factors not fully understood. Therefore, such continuously operable mechanisms may, at times when the fish are not feeding, deposit a wasteful excess of feed which results in spoilage of the feed and contributes to pollution of the tank. Or, at times when the fish are feeding vigorously, such devices may not provide sufficient feed, and the growth rate of the fish is therefore reduced. Of even greater consequence is the possibility of failure of such a device because of a power failure or a mechanical malfunction. If the device fails, proper development of the fish is not obtained and, if the failure is not discovered in time, it is even possible that a complete batch of fish may be lost. It is obviously of utmost importance that the fish feeder be of reliable, practical construction.

A second classification of feeding devices is that in which dispensing of feed is induced by normal feeding activity of the fish, wherein the fish actuate the feeding mechanism as by contacting or otherwise displacing a triggering mechanism within the water. These "demand-responsive" devices are potentially more efficient than the above-mentioned, continuously operable feeders because they are capable of providing the greatly increased amount of feed required during active feeding of the fish. However, such devices have not proven entirely satisfactory. At least one such feeder includes a feeding trough disposed within the water and rotatable relative to a second, wire mesh element positioned above it. Feed is normally contained in the trough to attract the fish, and actuation of the feeding mechanism is accomplished by fish causing rotation of the trough while attempting to reach the feed. Such feeding activity to cause rotation of the trough is unnatural and difficult for the fish and, in fact, may cause injury to the fish as they butt against the wire mesh while attempting to reach the feed below. Further, feed contained within the trough may spoil and contribute to pollution of the tank. Moreover, such feeders employ complex linkages of rods and chains which extend from the trough into the hopper for loosening and discharging quantities of feed and moveable elements within the hopper for releasing feed which has "bridged over" above an opening in the hopper. Rotational movement of the feed trough must therefore overcome resistance to movement of the connected portions within the hopper caused by the bridged over feed, which is difficult or impossible when moisture has caused the bridged over feed to stick together. Moreover, bottom-feeding fish, such as catfish, are accustomed to feeding by rooting along the bottom rather than against a small trough. Furthermore, the complexity of construction and excessive number of moveable parts of such a feeder is undesirable in that assembly and maintenance of the device is difficult and malfunctioning of any one of the parts may result in a stoppage of the feeding action. Of utmost importance in any a fish feeder is durable, rugged construction and reliability of operation, since a feeder may be left unattended, exposed to extremes of weather and moisture, over periods of days or weeks. Failure or malfunction may have severe, harmful effects upon thousands of fish, and, if not corrected in time, may result in loss of the fish and thus, substantial economic loss to the owner.

It is, accordingly, a major object of the present invention to provide a new and improved, demand-responsive fish feeder.

Another object is to provide a demand-responsive fish feeder capable of reliable, consistent operation over long periods of time and requiring only a minimum degree of maintenance.

A still further object is to provide such a feeder which is actuated upon movement in any direction of a pivotable, submerged portion.

Yet another object is to provide such a feeder which is highly sensitive to movement of adjacent fish and does not require aggressive contact by the fish.

A further object is to provide such a feeder of extremely rugged construction, having few moving parts, and in which the moving parts are conveniently located externally of the hopper.

A still further object is to provide such a fish feeder which is adjustable for accommodating particulate feed of various sizes and for dispensing feed at a preselected, desired rate.

An additional object is to provide such a feeder which does not tend to induce injury to the fish during feeding.

Yet another object is to provide such a feeder having a fixed tray located below the submerged portion for enhancing operation of the feeder by simulating the normal feeding environment of bottom-feeding fish.

Other objects and advantages will be apparent from the specification and the accompanying drawing illustrative of the invention.

In the drawing:

FIG. 1 is a side, elevational view, partially cut away, of a preferred embodiment of a fish feeder constructed according to the present invention and mounted in a body of water;

FIG. 2 is a top view of the structure of FIG. 1;

FIG. 3 is a longitudinal, sectional view, in an enlarged scale and taken on the line III—III of FIG. 5, of a portion of the structure of FIG. 1;

FIG. 4 is a view similar to FIG. 3 but showing the pivotal structure in a deflected position;

FIG. 5 is a cross-sectional view of the structure of FIG. 3 and taken on line V—V; and FIG. 6 is a perspective, enlarged view, partially cut away, of another portion of the structure of FIG. 1.

With initial reference to FIG. 1, a preferred embodiment of the demand-responsive fish feeder 10 includes a hopper 11, suitably of cylindrical configuration and having a bottom section 12 of frustoconical configuration. The bottom section 12 tapers to a lower end having a circular opening 14 formed therethrough coaxially of the bottom section 12. A removable cover 13 is fitted upon the top of the hopper 11 for permitting convenient loading of the hopper with particulate feed. An annular indentation 15 is suitably formed circumferentially around the sidewall of the hopper 11, and an annular skirt 16 extends downwardly from the indentation 15 externally of the hopper 11. The indentation 15 serves to provide a convenient supporting surface for the frustoconical bottom section 12, the peripheral portion of the bottom section 12 suitably being fitted above the inward projection of the indentation 15 and tack-welded or otherwise affixed thereto.

The skirt 16 is suitably bolted to a plurality of vertical supporting members 17, four such members being employed in the present, exemplary embodiment. With added reference to FIG. 2, the vertical supporting members 17 are preferably of approximately V-shaped, cross-sectional configuration, having two portions intersecting in an obtuse angle, for permitting the members 17 to be conveniently affixed to the skirt 16. A distal portion 18 of each of the supporting members 17 extends outwardly from the skirt 16, and the four supporting members 17 are positioned upon the skirt 16 with their respective distal portions 18 disposed in mutually parallel configuration, thereby facilitating mounting of the supporting members 17 upon adjacent structures. The hopper 11 is mounted in an upright position above the surface 19 of a fish-containing body of water, and is suitably mounted by being bolted to horizontal beams 20 extending from a pier 21. The distal portions 18 of the supporting members 17 are each preferably provided with a plurality of bores (not shown) spaced vertically apart for permitting the hopper 11 to be bolted at various heights relative to the pier 21. Alternatively, the hopper may be mounted upon a buoyant support which is anchored at a desired position in a tank.

In the preferred embodiment, a feed trough 24 of rectangular configuration and having raised edges is bolted to the supporting members 17 a distance below the water surface 19 and directly beneath the opening 14, for reasons which will become apparent. Mounted coaxially of and below the frustoconical bottom section 12 is a cylindrical shield 26, a tubular socket structure 27, and an elongated, pivotably structure 28 which extends within the shield 26. These three structures, together with connected elements to be explained hereinbelow, cooperate to form actuating means for the feeder, and will now be described in more detail.

With reference to FIG. 3, the cylindrical shield 26 is affixed, by welding or any other suitable means, coaxially to and below the frustoconical bottom section 12 of the hopper 11 (FIG. 1) and extends downwardly therefrom past the opening 14. If desired, windows (not shown) may be formed in the shield 26 to permit convenient observation of the internal parts. Supported coaxially within the shield 26 is a generally tubular socket structure 27. The socket structure 27 is preferably supported by radially extending struts 29, as more clearly shown in FIG. 5. The struts 29 are suitably welded to the tubular socket structure 27, and a respective distal end portion 30 of each of the struts 29 is curved to seat against the inner surface of the shield 26. The struts 29 are fastened to the shield 26 by bolts 31 which extend through suitable bores formed through the respective curved, distal end portions 30 of the struts 29. With reference to FIG. 3, vertically extending slots 32 are formed through the shield 26 in register with the bores in the distal, curved portions 30 (FIG. 5) for accepting the bolts 31. The vertical slots 32 permit vertical adjustment of the relative position of the tubular socket structure 27 within the shield 26 and provide important advantages, which will become apparent.

The tubular socket structure 27 has a lower portion curved spherically inward to form a bearing structure 33 providing an upper bearing surface of semi-spherical curvature. The elongated pivotal structure 28 suitably comprises an elongated tubular member 35 having affixed thereto a semi-spherical bearing member 34, the bearing member 34 being configured to seat slideably and rotatably upon the inner surface of the lower bearing portion 33 of the socket structure 27. The bearing member 34 is suitably welded to the tubular member 35 at a point spaced from its upper end by approximately one-fifth of the total length of the tubular member 35, and preferably at a point above the center of mass of the structure 28. This permits pendulous movement of the structure 28 and induces a normally upright, centered, first position of the structure when at rest. The pivotal structure 28 further includes an annular plate structure 36 affixed to the upper end of the tubular, elongated member 35 and having the form of an inverted cup having a substantially flat, upper surface 37 normally positioned directly beneath the opening 14. Preferably, a raised projection 38 is centrally formed on the upper surface 37 of the plate structure 36. The upper surface 37 is of greater minimum diameter than the opening 14 and normally prevents passage through the opening 14 of the feed pellets, a few of which are represented at 39 above the plate structure 36 and within the hopper lower section 12. The plate structure 36 is also of greater diameter than the tubular socket member 27 and is normally positioned immediately above the upper portion of the socket member 27.

The pivotal structure 28 is thus free to pivot in any direction upon the bearing section 33, but is limited in its pivotal movement by contact with the inner surface of the upper end of the socket structure 27. With reference to FIG. 4, the pivotal structure 28 is shown in a second, displaced position in which it has been pivoted in a clockwise direction, as viewed in the drawing, until it is stopped by contact of the tubular member 35 with the upper portion of the tubular socket structure 27. The socket structure 27, tubular member 35, and plate structure 36 are relatively dimensioned such that part of the upper surface 37 of the plate structure 36 still remains below the opening 14. More specifically, a portion of the upper surface 37 is in vertical register with the opening 14 during all pivotal positions of the pivotal structure 28 for preventing feed from being continuously dispensed from the opening 14 even if the structure 28 is maintained in its extreme, pivoted position. Further, the plate structure 36 is of sufficient diameter to extend completely over the tubular socket structure 27 during all pivotal movement for preventing the feed from falling into the socket structure 27 and hindering the pivotal movement. The downwardly extending lip of the plate structure 36 is effective to prevent splashing of water upwardly from the tank onto the feed.

With reference again to FIG. 1, the elongated, pivotal structure 28 has a lower portion 40, comprising the portion normally disposed below the water surface 19, extending downwardly to a point adjacent the trough 24. With reference to FIG. 6, the lower portion 40 preferably is weighted by an inverted, relatively heavy cup member 43 which is removably fitted upon the lower end of the tubular member 35 by any suitable means. Radially extending, tubular members 44, preferably of a semi-resilient, urethane plastic, are suitably fitted within corresponding bores formed through the cup member 43, and provide communication between the interior of the cup member 43 and the surrounding water. The cup member 43 preferably is further provided with a plurality of small openings 45 formed through the lowermost portion. An inlet opening 46 is formed through one side of the tubular member 35 above the normal water level, and a semicylindrical, spring cap 47, adapted to be clamped upon the tubular member and over the opening 46, is provided, as also shown in a closed position in FIG. 3 and FIG. 4. While the feeder 10 has been described as being constructed of metal, other materials, such as fibrous reinforced plastic, are also suitable. In any case, it is preferred that the lower portion of the pivotal structure 28 have at least an external coating of a resilient material, such as a urethane polymer, a fragmentary portion being represented at 41, for preventing injury to fish which will butt against the lower portion 40 during feeding.

In operation, the hopper 11 is filled with a supply of feed pellets, typically a supply sufficient for a week or more of operation. It will be noted from FIG. 3 that, while the pivotal structure 28 is in its first, or upright, position, the feed pellets 39 tend to drop from the opening 14 onto the upper surface 37 and to pile up in a somewhat conical heap as does any particulate material which is dispensed upon a flat surface from a fixed discharge opening. Upon the elongated, pivotal structure 28 being pivoted to its second position as shown in FIG. 4, however, the left portion (as shown) of the conical mass of feed pellets 39 now formed beneath the opening 14 extends over the left edge of the plate 36 and thus falls from the plate 36, through the open cylindrical shield 26, and into the water. Further, while the plate structure 36 is displaced to the right, a greater amount of feed is permitted to collect upon its right portion and, upon the pivotal structure 28 being returned, in a counterclockwise rotational direction, to a leftward position (not shown) of the plate structure 36, additional feed falls over the right edge of the plate structure 36. While reference to leftward and rightward positions of the pivotal structure 28 are employed with reference to the drawing for clarity of illustration only, it is to be understood that in operation, the feeding operation occurs upon pivotal movement of the structure 28 in any direction. The raised portion 38 further serves to push the feed over the side of the plate 36 and agitate and loosen the conical mass above the plate 36. In an alternate embodiment, a load-supporting element (not shown) is immoveably positioned within the frustoconical bottom section 12 and spaced a distance above the opening 14 for minimizing pressure exerted by the weight of the feed against the plate structure 36. Such an element is suitably of conical configuration, disposed coaxially above the opening 14 and diverging downwardly. The use of this optional, load-bearing element further reduces frictional resistance to operation of the feeder and is useful when very small fish are to be fed, but is not necessary for normal operation.

To begin the feeding operation, the pivotal structure 28 is pivoted to its second, displaced position, as shown in FIG. 4, to permit a quantity of feed to be pushed over the left side of the upper surface 37 of the plate structure 36 and into the water. As the feed falls into the water, a majority of the pellets tend to come to rest within the feed trough 24 located below the hopper 11. This initial dispensing of feed attracts the fish to the feeder 10 and the fish will begin to feed actively above the trough 24. Upon fish contacting or possibly merely swimming adjacent the lower portion 40 of the pivotal structure 28 during feeding, further pivotal movement of the structure 28 occurs, and further amounts of feed are released. This further incites the fish to feed over the trough 24, and continuous pendulous movement of the pivotal structure 28 occurs whereby feed is continuously released into the water until each of the fish has finished feeding, whereupon the structure 28 returns to its upright position and the feed is again retained by the plate structure 36. Because of the use of a fixed trough 24 rather than a moveable element as in prior art devices, bottom-feeding fish are able to feed upon the bottom of the trough as in their natural environment, and it has been observed that they quickly learn to return to the trough area for feeding even though no feed may remain upon the trough. Operation of the feeder has been accomplished without the trough 24, though less satisfactorily. An alternative usage is to suspend the feeder adjacent to the bottom of the tank without the trough and permit the feed to fall to the bottom of the tank. The fish are observed to return to the trough habitually though no feed remains thereon; thus feed is not wasted after feeding, and pollution of the tank is minimized.

In addition to the feeding action caused by pivotal movement of the pivotal structure 28 in any direction, rotation of the structure 28 about its axis by fish contacting the radially extending members 44 also induces additional dispensing of feed by loosening and dispensing feed upon the plate structure 36. However, rotational movement is not required for operation.

It has been observed that fish will soon learn to actuate the feeder 10 after only a few manually induced feedings by initial pivoting of the structure 28. In addition, however, the inlet opening 46, openings 45, and the radial, tubular members 44 provide a means for releasing a scent-producing material into the water adjacent the lower portion 40 for further attracting the fish and are useful in training young fingerlings to feed. A scent-producing element such as asafetida or a mixture of anise oil and cheese is introduced into the inlet 46 and falls within the tubular member 35 to the cup shaped member 43, whereupon it is dissolved in the water and slowly dispensed through the tubular, radial members 44 and the openings 45. These scent-producing substances incite the fish to feed more vigorously, even in unfavorable weather conditions, and can thus be used to improve the growth rate obtained. Alternatively, the scenting substance may be introduced in a paste form by a pressure-operated apparatus of the type used in dispensing caulking or grease.

The adjustable feature described above with respect to positioning of the tubular socket structure 27 within the shield 26 provides a means for both adjusting the rate of feeding and for adjusting the feeder 10 for accomodating various sizes of pellets as required for various sizes of fish. Moving the socket structure 27 upwardly moves the plate 36 closer to the opening 14 and results in less feed being permitted to fall from the opening 14, and less feed is dispensed for a given degree of movement of the pivotal structure 28. Alternatively, moving the socket structure 27 downwardly permits faster feeding. Or, vertical adjustment of the socket structure 27 may be employed to provide a desired feeding rate for any one of several sizes of feed pellets.

It can thus be seen that the apparatus provides a demand-responsive fish feeder which is of simple, rugged construction and has very few moving parts. Because of the mechanical advantage produced by having the pivotal socket spaced relatively farther from the lower end than the upper end of the tubular member 35 and because of the lack of any restricting elements connected to the moveable parts and located within the hopper 11, even a slight force upon the lower portion 40 will activate the feeder 10.

It will be observed that, because of the absence of stirring elements located within the hopper 11 for loosening "bridged-over" feed, substantially no resistance to movement of the pivotal structure 28 must be overcome by the fish. Furthermore, the plate structure 36 and the shield 26 effectively prevent splashing of water onto the feed 39, thus ensuring effective dispersal of the feed by preventing stoppages which may result when the feed becomes "bridged" or stuck together after becoming moist. The feeder thus satisfies the criterion of being reliably operable even while exposed to extremes of weather and moisture. Finally, while providing the above-cited advantages, the feeder is nevertheless of far simpler design than prior-art devices, and it is thus of practicable, economical construction.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. A demand-responsive fish feeder operable to dispense particulate feed into a fish-containing body of water and comprising:
   a hopper for containing a supply of particulate feed and adapted to be positioned above the water surface, the hopper having a lower portion having an opening therethrough;
   actuating means, disposed externally of the hopper and having a lower portion adapted to extend below the water surface, for normally preventing passage of feed through the hopper opening and for releasing desired quantities of feed in response to movement of the lower portion by fish adjacent the lower portion, the actuating means including a feed retaining means, comprising a plate structure positioned between the hopper opening and the water surface during operation of the feeder, for collecting feed which flows through the hopper opening, the plate structure having an upper surface confronting the hopper opening, the actuating means further comprising orbital producing support means for moving the plate structure in any horizontal direction generally parallel to its upper surface in response to movement of the lower portion of the actuator means by fish for dispensing feed into the body of water.

2. The apparatus of claim 1, further comprising a feed trough immoveably located below the hopper and adjacently below the lower portion of the actuating means for retaining feed released from the hopper, whereby fish are attracted to the feed and caused to habitually seek feed adjacent the trough, thereby causing movement of the lower portion of the actuating means.

3. The apparatus of claim 1, wherein the lower portion of the actuating means comprises the lower portion of an elongated structure, the plate structure comprising an upper portion of the elongated structure, the plate structure having a minimum diameter greater than the maximum diameter of the hopper opening, the actuating means further comprising means for pivotally supporting the elongated structure at a portion of the elongated structure spaced from its end portions and for positioning the elongated structure below the hopper and with the plate structure adjacently below the hopper opening.

4. The apparatus of claim 1, further comprising means for changing the spacing between the plate structure and the hopper opening for varying the rate of release of feed for a given degree of movement of the lower portion of the elongated structure and for permitting the dispensing, at a desired rate, of particulate feed of a selected one of several sizes.

5. A demand-responsive fish feeder operable to dispense particulate feed into a fish-containing body of water and comprising:

a hopper for containing a supply of particulate feed and having a lower portion having an opening therethrough;

means for positioning the hopper above the water surface; and actuating means, including a substantially rigid, elongated structure having an upper portion, comprising a plate structure positioned between the hopper opening and the water surface and having an upwardly facing surface wider than and confronting the hopper opening, and a lower portion extending below the water surface, for normally preventing passage of feed through the hopper opening and for dispensing desired quantities of feed in response to movement of the member lower portion by fish adjacent the lower portion, the plate structure comprising a means for collecting feed, which flows through the hopper opening, into a pile which projects upwardly to the hopper opening for interrupting the flow of feed when the plate structure is centered beneath the hopper opening, the actuating means further comprising support means for providing limited orbital type movement of the plate structure in a generally horizontal plane in any direction in response to movement of the lower portion of the elongated structure by contact of the fish.

6. The apparatus of claim 5, further comprising supporting means for pivotally supporting the elongated structure below the hopper and permitting both pivotal movement of the structure about a point spaced from its end portions and rotation of the structure upon its longitudinal axis, the supporting means further comprising means for positioning the plate structure with its upper surface spaced adjacently below the hopper opening by a distance greater than the minimum dimension of the particulate feed.

7. The apparatus of claim 6, wherein the elongated structure is supported from a portion thereof above the center of gravity of the elongated structure for permitting the elongated structure to remain normally upright and to pivot pendulously.

8. The apparatus of claim 6, further comprising a feed trough immoveably located below the hopper and adjacently below the lower portion of the elongated structure.

9. The apparatus of claim 6, wherein at least part of the lower portion of the elongated structure has a resilient external material for preventing injury to fish which contact the lower portion.

10. The apparatus of claim 6, wherein the lower portion of the elongated structure further includes means for facilitating rotation of the elongated member and including a radially projecting element having a resilient, external material.

11. The apparatus of claim 6, wherein the elongated structure includes a tubular portion extending from above to below the water surface, the elongated structure further including an inlet to the tubular member which inlet is above the water surface for receiving a scent-producing substance, the elongated structure including means positioned below the water surface for receiving the scent-producing substance from the tubular portion and releasing it into the water adjacent the lower portion of the elongated structure.

12. The apparatus of claim 6, wherein the upper surface of the plate structure of the elongated structure is circular and includes a central, raised portion.

13. The apparatus of claim 3, further comprising means for limiting the pivotal movement of the elongated structure to a range in which the hopper opening remains in vertical alignment with a portion of the plate structure.

14. The apparatus of claim 13, wherein the means for limiting pivotal movement of the elongated structure comprises structure extending peripherally of the elongated structure and fixedly positioned in horizontal alignment with the elongated structure at a portion thereof spaced from the pivot point of the means for pivotally supporting the elongated structure.

15. The apparatus of claim 14, wherein the means for limiting the pivotal movement of the elongated structure comprises a tubular member encircling the elongated structure and extending vertically upward from the means for pivotally supporting the elongated structure.

16. The apparatus of claim 1, wherein the plate structure is positioned within a spray deflecting means for shielding feed upon the plate structure from moisture from the body of water.

17. The apparatus of claim 6, further comprising means for limiting pivotal movement of the elongated structure to a range in which the hopper opening is in vertical alignment with a part of the plate structure, the means for limiting pivotal movement comprising an annular structure encircling the elongated structure and fixedly positioned at a location spaced from the pivot point of the elongated structure.

* * * * *